April 9, 1963 J. A. GREGOIRE 3,084,352
STRETCHERS AND THE LIKE HAND-OPERABLE CONVEYANCES
Filed March 14, 1960 2 Sheets-Sheet 1

INVENTOR
JEAN ALBERT GREGOIRE
BY: Mead, Browne, Schuyler & Beveridge
ATTORNEYS

April 9, 1963  J. A. GREGOIRE  3,084,352
STRETCHERS AND THE LIKE HAND-OPERABLE CONVEYANCES
Filed March 14, 1960  2 Sheets-Sheet 2
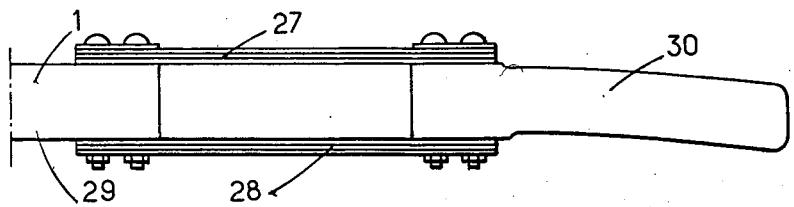
FIG. 6
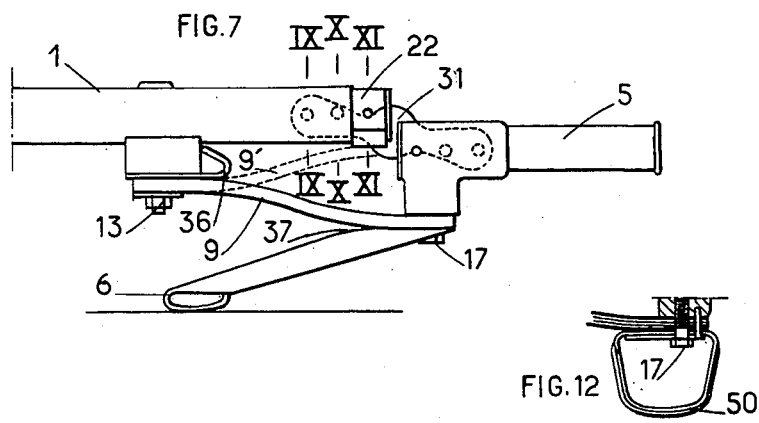
FIG. 7
FIG. 12
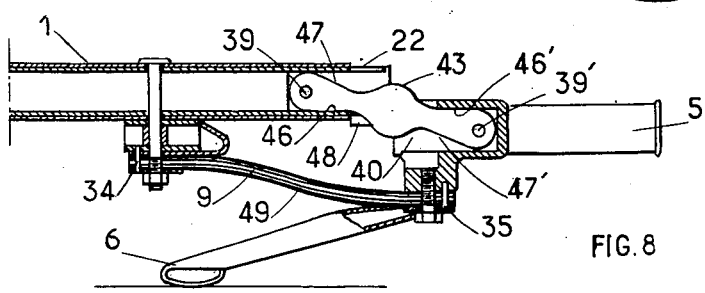
FIG. 8
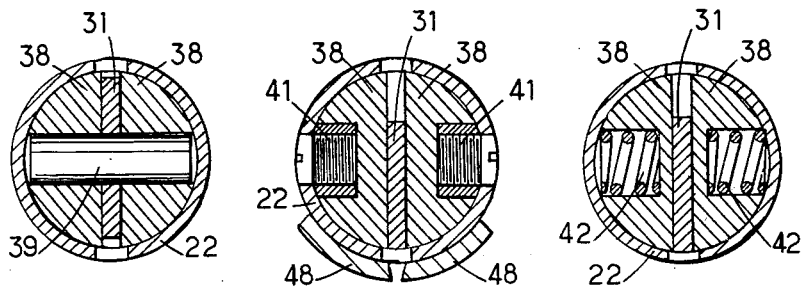
FIG. 9  FIG. 10  FIG. 11
INVENTOR
JEAN ALBERT GREGOIRE
BY: *[signature]*
ATTORNEYS United States Patent Office
3,084,352
Patented Apr. 9, 1963

3,084,352
STRETCHERS AND THE LIKE HAND-OPERABLE CONVEYANCES
Jean Albert Gregoire, 92 Ave. Niel, Paris, Seine, France
Filed Mar. 14, 1960, Ser. No. 14,866
Claims priority, application France Mar. 13, 1959
8 Claims. (Cl. 5—82)

My invention has for its object improvements in stretchers and the like means for conveying wounded or sick persons, hand-barrows for the transportation of commodities or brittle articles, wheel-barrows and the like apparatus of the same type adapted to be carried at least partly by hand.

My invention has more particularly for its object suspension means for such conveying apparatus, chiefly in the case of stretchers for the conveyance of wounded or sick persons, so as to ensure a maximum comfort for such persons, both during their actual manual conveyance and during their transfer on the stretchers in vehicles, while cutting out any risk of shocks as much as possible.

Furthermore, it has been found that, from the standpoint of the bearers carrying the stretchers, hand-barrows or the handles of a wheel-barrow, etc., it is of considerable interest to provide a suspension between the load and the handles with a view to damping the shocks transmitted to the arms of the bearers, this considerably furthering their work and reducing their fatigue.

To this end, a primary object of my invention consists in the execution of a suspension to be inserted between the handles and the body of the stretcher or the like device, said suspension being remarkably efficient and of a low cost price.

It has also for its object the execution of a suspension of this type which is also operative when the stretcher rests, on its feet or on rollers, inside a vehicle for instance, whereby the suspension of the vehicle is associated with the suspension incorporated with the stretcher.

My invention has furthermore for its object the damping of the oscillations, if required. To this end, it consists in using for the suspension of each stretcher element a blade spring secured at its ends respectively to the body of the stretcher or the like support and to the corresponding handle, for cooperation with an elastically or pivotally secured member such as another blade spring or a link arranged in substantial parallelism with the first-mentioned blade spring, so as to form with the latter a sort of pivotal link parallelogram.

On ther other hand and in conformity with my invention, in the case where it is desired to provide stretchers for wounded persons or apparatus for the conveyance of brittle material, for instance, the actual handles will be connected directly with the feet, rollers or the like supports, through which the stretchers may be laid on the ground or on the floor of a vehicle, for instance, in a manner such that the suspension may also operate efficiently when the stretcher lies on the ground or on the floor of a vehicle.

According to another feature of my invention, and chiefly in its application to stretchers for the conveyance of wounded persons or the like, the blade spring may be normally subjected to a tensioning before the stretcher is subjected to the load it has to carry. Thus, the suspension may show the maximum yieldingness consistent with the available vertical shifting of the suspended section with reference to the non-suspended section of the stretcher.

Further features may also be provided in conformity with my invention, chiefly in the case where the suspension of each element or group of elements is produced through blade springs cooperating with a pivotal link. Thus, in particular, the original curvature of the pack of blades forming the elastic element may be reduced in a manner such that the pack of blades may be substantially rectilinear when the stretcher is under load, and is incurved in the direction opposed to its original curvature under the action of dynamic loads. Said arrangement shows the advantage consisting in that, under the action of the vertical movements of the stretcher handles and feet with reference to the stretcher body, the longitudinal shifting of said parts with reference to each other is considerably reduced. Furthermore, cams engaged by the springs may be provided for gradually reducing the operative length of the spring elements when the load increases, so as to ensure a variable rigidity.

Lastly, the links which ensure, in association with the springs, a connection between the suspended section and the non-suspended section may be constituted by flat elements movably fitted between flat bearing surfaces which serve for guiding said elements which are pivotally secured to said surfaces.

In addition thereto, the flat bearing surfaces just referred to and between which the links move may be subjected to the action of springs producing a friction between said links and said bearing surfaces, said friction leading to a damping of the oscillations of the links.

Further objects and features of my invention will appear in the reading of the following description, reference being made to the accompanying drawings illustrating diagrammatically, by way of example and without any limiting sense, various embodiments of my invention. In said drawings:

FIGS. 1 to 5 relate to a stretcher executed in conformity with a first embodiment of my invention and intended for the conveyance of sick or wounded persons. In particular, FIG. 1 is an elevational view of a complete stretcher.

FIG. 6 illustrates an element of the suspension for a wheel barrow handle.

FIGS. 7 to 12 relate to a second embodiment of a stretcher according to my invention. In particular, FIG. 7 is an elevational view of a suspension of one of the four handles of said stretcher. FIG. 8 is a longitudinal cross-section of said suspension. FIGS. 9, 10 and 11 are large scale cross sections through line IX—IX, X—X and XI—XI of FIG. 7.

FIG. 12 is a sectional view of a modification of the foot of the embodiment illustrated in FIG. 7.

Figure 1:
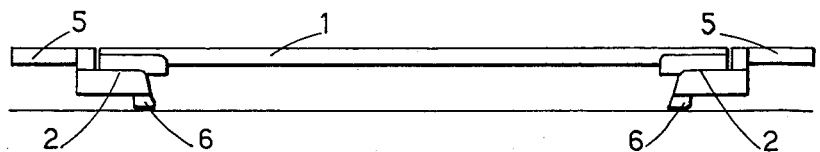

In FIG. 1, 1 designates the stringers or the like supports of the bed on which the sick or wounded person lies, so as to form with the latter the suspended weight.

The elementary suspensions 2 are inserted between the stringers and the members carrying the stretcher such as the feet 6 and the handles 5.

Figure 2:
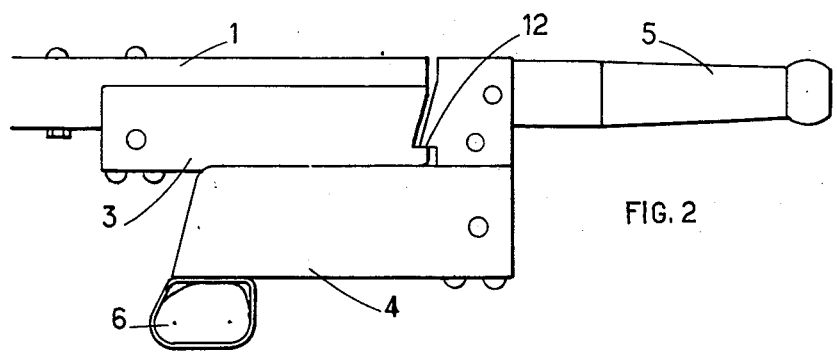
FIG. 2 is, on a larger scale, a lateral elevational view of an elementary suspension for one side of one end of the stretcher.
Figure 4:
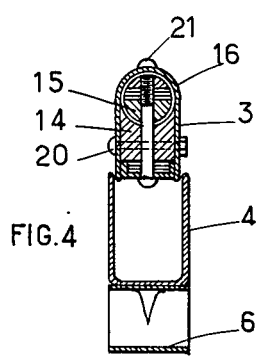
FIG. 4 is a cross-section along the broken line IV—IV of FIG. 3.

FIG. 2 shows that the operative parts of each elementary suspension are concealed behind a casing 3 rigid with the stringer such as 1 and behind another casing 4 rigid with the corresponding carrier members constituted by the handle 5 and the foot 6, the narrower casing 3 sliding inside the casing 4, as clearly shown in FIG. 4.

The bed, generally constituted by a sheet of canvas which is not illustrated and which is stretched between the two stringers 1 (FIG. 3) in the conventional manner, may extend up to the end of the casing 3, to which it is screwed or glued.

Figure 3:
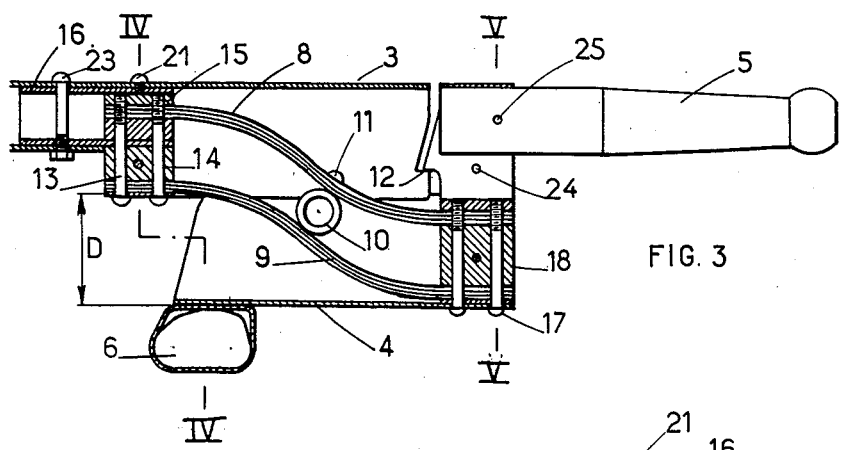
FIG. 3 is a longitudinal cross-section corresponding to FIG. 2.

In FIG. 3, the casings are drawn as partly sectionalized, so as to show the suspension inside it. The latter includes two packs of spring blades 8 and 9. These two blade packs are widely spaced apart so that, under the action of a load, the angular movement of the system including the casing 4, the hand 5 and the foot 6 may be practically negligible. This means that the two packs of blades behave substantially after the manner of two opposite sides of a parallelogram, the four sides of which are pivotally connected together.

However, it may occur that, upon taking hold of the handle through its end, a substantial torque is exerted on the suspension which may make the blades buckle. In order to cut out this difficulty, there is provided between the two packs a stay 10 of circular shape, secured only to one of said packs of blades by means of a screw 11.

In FIGS. 2 and 3, the elementary suspension element is illustrated in its inoperative position without any further load than the weight of the bed.

The spring blades are however constituted, in accordance with the invention, in a manner such as to be provided in said position with a preliminary tensioning adapted to overcome the action of gravity on the bed. This tensioning is absorbed by a stop 12 rigid with the casing 3 which is urged under pressure into engagement with the casing 4 (FIGS. 2 and 3).

In the present embodiment, the handle 5 lies, when inoperative, in the plane of the bed 1. The maximum possible vertical shifting under the static and dynamic action of the load is shown at D in FIG. 3.

In the example illustrated, the blades, when inoperative, assume the shape of an S, as apparent from inspection of FIG. 3 and they have a tendency to straighten and to become perfectly rectilinear when the lower pack 9 engages the lower surface of the casing 4 and the vertical shifting is thereby equal to the maximum value D.

Thus, the blades are straightened to a greater extent when the load increases, which reduces the risk of buckling and consequently, of an angular shifting of the system including the handle and foot.

I will now disclose, by way of example, a numerical example for the calculation of the power to be given to the springs.

The original stressing of the springs in their inoperative position may obviously be selected within a broad range. For a stretcher intended for the conveyance of adults, it is possible to provide, for instance, an original stressing of 5 to 10 kg. for each elementary suspension. Assuming 10 kg. is the value selected, it is obvious that the weight of a person conveyed increased by that of the suspended section of the stretcher should rise above 40 kg. for the suspension to operate. If it is assumed that the load required for bringing the blades into engagement with their abutment is equal to 50 kg. per elementary suspension, to wit 200 kg. altogether, the average rigidity will, for a maximum vertical shifting equal to, say, D=50 mm., be equal to $$\frac{200-40}{50}=3.2 \text{ kg. per mm.}$$

If no initial tensioning were provided, it would be necessary to provide a rigidity of $$\frac{200}{50}=4 \text{ kg. per mm.}$$

for obtaining a same load of 200 kg. upon abutment. The comfort would then be of a reduced grade.

It should be remarked that the frequency of natural oscillation of the suspension for the normal loads to which it is subjected is, in all cases, clearly higher than the frequency corresponding to the pace of the bearers, which cuts out in practice any risk of resonance.

It will also be remarked, upon inspection of FIG. 2, that the casings 3 and 4 which are preferably constituted by metal sheets folded in the shape of a U conceal completely the blade packs. This prevents the bearers from being wounded through insertion of their fingers between the foot 6 and the pack of blades 9.

Figure 5:
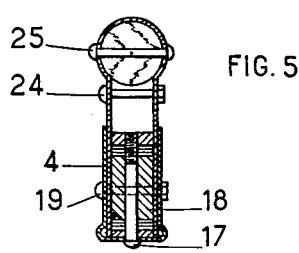
FIG. 5 is a cross section through line V—V of FIG. 3.

FIGS. 4 and 5 are sectional views of an embodiment of the means for securing the ends of the springs, on the one hand, to the stringers (FIG. 4) and, on the other hand, as shown in FIG. 5, to the casing 4 carrying the foot 6 and the handle 5.

On the side facing the bed, the blade packs are secured through the agency of screws 13 to the stays 14 and 15 and, thereby, to a tube 16 engaging the corresponding stringers. On the side facing the handle and the foot, the pack of blades is secured through the screws 17 to the stay 18 and, thereby, to the casing 4 to which the foot 6 is rigidly secured by an elastic weld, for instance. In order to ensure a still more resistant assembly between the spring blades and the casing 4, it is possible to insert a transverse bolt 19 which rigidly secures the casing 4 on the stay 18.

On the other hand, the protecting casing 3 is secured to the stay 14 through the agency of a transverse bolt 20 and to the tube 16 through the screw 21.

It is thus apparent that it is possible to execute a perfectly autonomous suspension, which is assembled with the bed upon introduction of the tube 16 into the tubular stringer 1 of the bed, which stringer is secured to the tube 16 through the agency of the bolt 23.

The handle 5 may be of a removable type and made of wood, since the contact with wood is pleasanter than the contact with metal.

The assembly of the handle with the casing 4 is obtained, for instance, through clamping by means of a bolt 24 (FIGS. 3 and 5). A pin 25 ensures the correct position of the handle in the casing and forms a safety in the case of any release of the bolt 24.

FIG. 6 illustrates the application of the suspension according to the invention, to the handle of a wheel-barrow. In such a case, the comfort sought for need not be equal to that of a stretcher for wounded or sick persons, and it is sufficient to provide for the damping of the shocks produced by the passage of the wheel passing over more or less uneven hindrances. The suspension may then be simplified and reduced to two spaced packs of blades 27 and 28 secured directly, on the one hand, to each stringer 29 of the wheel-barrow and, on the other hand, to the corresponding handle 30, said stringers and handles serving as stays spacing the two packs of blades.

The following figures refer, as already mentioned, to another embodiment of a stretcher according to my invention. In FIG. 7, 1 designates, as precedingly, the stringer of the stretcher carrying the bed on which the patient lies. 5 and 6 designate, as precedingly, the system including the handle and foot adapted to carry the stretcher, but, in such a case, said system is connected with the stretcher, on the one hand, by the spring 9 and, on the other hand, by a link 31.

The spring 9 is secured at one end to the corresponding stringer of the bed, through the agency of a single bolt 13, which may serve also for securing the conventional pivotal struts when the stretcher is of a foldable type.

At its other end, the pack of spring blades is clamped between the foot 6 and the handle 5 by means of a screw 17. At each end of the pack of blades is provided a stud for the correct alignment of the spring, as shown in FIG. 8, the stud 34 engaging the bed carried by the stringer 1 and the stud 35 engaging the handle 5.

In FIG. 7, it will be remarked that the curvature of the spring is equal to about one half of the maximum possible vertical shifting, the spring assuming, at the end of a complete stroke, the position 9' illustrated in dotted lines.

It may also be ascertained, from inspection of FIG. 7, that, as soon as the spring assumes a rectilinear shape or a position corresponding to the weight of a patient of an average build, say 70 kg., the cam 36 on the side corresponding to the bed and the cam 37 rigid with the foot 6 engage the blades and reduce gradually their operative length and, consequently, the flexibility of said spring.

Under the weight of a patient heavier than the average patient, the flexibility of the suspension will consequently decrease, so that the comfort will remain unvaried, while the maximum vertical shifting is smaller than that which would be obtained with a suspension of a constant flexibility. The available maximum vertical shifting is thus used under better conditions.

This last arrangement shows the following advantages: when the spring carries its normal load, it lies, as mentioned hereinabove, in the vicinity of alignment, the blades extending then rectilinearly and the vertical oscillations to either side of the corresponding position are, for instance, of the magnitude of ±10 mm. Under such conditions, the longitudinal movement of the foot with reference to the bed is less than 0.5 mm. and is consequently negligible.

On the other hand, for a maximum vertical shifting of the suspension, the longitudinal displacement of the suspended section with reference to the non-suspended section rises hardly above 2 mm.

The link 31 is flat and its thickness is equal to about 3 to 5 mm. Each of its ends is held between the flat surfaces of two semi-cylindrical bearing members 38 and is pivotally secured between the latter through the agency of a pin 39 (FIGS. 8 and 9).

The sets of two associated bearing members are inserted laterally into the girder 22 fitted in the stringer 1' and into a bore 40 formed in the handle (FIG. 8) respectively.

The ends of the girder 22 and the handle 5 in registry with the bore 40 are slotted throughout the length required for ensuring the free and complete angular shifting of the link 31.

The semi-cylindrical bearing members 38 are held in position inside the girder 22 and the handle 5 respectively through the agency of studs 41 (FIG. 10) screwed radially into said semi-cylindrical bearing members.

FIG. 11 shows how it is possible by inserting one or more springs 42 between the stringer or the handle, on the one hand, and each semi-cylindrical bearing member, on the other hand, to obtain a damping of the oscillations which is more or less marked according to the tensioning of the springs, as provided by the friction arising under the action of said springs between the semi-cylindrical bearing members 38 and the link 31.

The desired dry friction which cannot lead to seizing may be obtained, for instance, by resorting for the semi-cylindrical bearing members to a suitable plastic material showing furthermore the advantage of not requiring any lubrication, for the pivotal connections of the link. The link is given the shape illustrated in the drawings, i.e. it includes an enlarged central section 43 which central section is the only section lying outside the semi-cylindrical bearing members, so that the transversely broader section may better absorb transverse stresses.

Between the pivots constituted by the pins 39 and 39', at the ends of the link and the central section 43 of the latter, the outline of the connecting rod includes to either side rectilinear portions 46, 46', 47, 47' extending symmetrically with reference to the longitudinal axis passing through said pivots.

These rectilinear portions engaging, on the one hand, the tubular girder 22 fitted in the stringer 1 and, on the other hand, the surface of the bore 40 in the handle 5, serve as abutments either in the inoperative position for which the outline portions 46 and 46' are operative as abutments, or else, in the position of maximum vertical shifting for which the outline portions 47, 47' are operative.

However, and preferably, the abutments 47 and 47' should not become operative until another silent abutment system has been previously crushed to a maximum.

In order to prevent any risk of injuring the bearer's fingers upon application of his hands between the spring 9 and the girder 22 fitted in the stringer 1, it is possible, as a matter of fact, to secure through screwing or even mere gluing a yielding pad 48 of rubber, for instance, underneath the girder 22 (FIGS. 8 and 10). Said pad should be made of two parts or it should be merely slotted in order to ensure a free angular shifting of the link across its bulk (FIG. 10). Again, in order also to prevent any risk of injury, the pack of spring blades 9 may be inserted inside a sheath 49 of rubber or of plastic material adapted to shrink under the action of heat or moulded directly over the spring pack.

Through the abutments 46 and 46', the position of each of the four feet is well-defined with reference to the bed. The abutment is a clean one and is noiseless, since, on the one hand, the link bears against the cooperating abutments over a substantial length and, on the other hand, the link being clamped between the semi-cylindrical bearing members cannot vibrate.

It will be remarked that, when inoperative, the handles 5 are not in alignment with the girder 22. The stringers carrying the bed lie at a higher level than the handles by an amount equal to about one half of the total possible vertical shifting of the suspension, so that, under the load of a patient of an average build, and by reason of the rectilinear shape of the spring blades, the handles are alined with the stringers and are shifted above the latter only for a larger static load, or under the action of dynamic loads.

As already described with reference to the embodiment illustrated in FIGS. 1 to 5, the springs are already tensioned, when in the idle position illustrated in FIGS. 7 and 8, for the same reason as in the case of the above-mentioned embodiment.

The handle may be made of wood, as already mentioned, or of an aluminium alloy and its actual grip section may be sheathed by means of rubber or plastic materials, so as to prevent any contact between the bearer's hands and metal, which may be objectionable in the case of very cold weather.

The handle may also be made of a sufficiently resistant plastic material, with the incorporation therewith, if required, at the moment of the casting, of the metal nut which serves for the securing of the spring to said handle, through the agency of a screw 13.

A modification of the foot is illustrated at 50 in FIG. 12. Said foot acts as a cam for the blade spring, but it rests on the ground in vertical registry with the securing screw 17. The feet may also be replaced by straps carrying rollers.

The cutting of the canvas forming the bed requires no particular care and it is simply perforated, so as to provide a passageway for the screws 13 securing the springs on the girders.

Obviously, numerous modifications may be brought to the arrangements disclosed, without unduly widening the scope of the invention as defined in the accompanying claims, said invention being by no means limited to the embodiments described.

What I claim is:

1. In a portable conveyance, chiefly a stretcher, comprising a bed and a foot and handle system for carrying said bed at each end of the latter, the provision of a suspension comprising at least one pack of blade springs connecting each end of the bed with the cooperating foot and handle system, and at least one link extending in substantial parallelism with each pack and pivotally connected with the corresponding end of the bed and with the cooperating foot and handle system, and fittings rigid respectively with each end of the bed and with the cooperating foot and handle system and engaging each the corresponding end of the link of the suspension on the same end of the bed.

2. In a portable conveyance, chiefly a stretcher, comprising a bed and a foot and handle system for carrying said bed at each end of the latter, the provision of a suspension comprising at least one pack of blade springs connecting each end of the bed with the cooperating foot and handle system, and at least one link extending in substantial parallelism with each pack and pivotally connected with the corresponding end of the bed and with the cooperating foot and handle system, the springs when unstressed urging the bed upwardly and the normal load of a patient on the bed stressing the springs into substantial rectilinear alignment with the bed.

3. In combination with a portable stretcher, comprising a rectangular bed and carrier means associated with each apex of the rectangular bed, a shock-damping suspension comprising a pack of blade springs connecting each apex of the rectangular bed with the associated carrier means, four pairs of guides provided each with vertical parallel guiding surfaces facing each other to either side of the gap between them and parallel with the longitudinal axis of the stretcher, the guides of each pair being yieldingly carried respectively by the corresponding apex and by the carrier means associated with said apex, four flat links fitted between the guiding surfaces of the guides of the corresponding pair to be held and pivotally supported between said guiding surfaces, the length of each link being selected to ensure substantially parallelism between said link and the pack of blade springs connecting the apex and the cooperating carrier means carrying last-mentioned guides.

4. In combination with a portable stretcher, comprising a rectangular bed and carrier means associated with each apex of the rectangular bed, a shock-damping suspension comprising a pack of blade springs connecting each apex of the rectangular bed with the associated carrier means, four pairs of guides provided each with parallel vertical guiding surfaces facing each other to either side of the gap between the latter and parallel with the longitudinal axis of the stretcher, the guides of each pair being yieldingly carried respectively by the corresponding apex and by the carrier means associated with said apex, four flat links fitted between the guiding surfaces of the guides of the corresponding pair to be held and pivotally supported between said guiding surfaces, the length of each link being selected to ensure substantial parallelism between said link and the pack of blade springs connecting the apex and the cooperating carrier means carrying last-mentioned guides, and springs urging said guiding surfaces towards each other to damp the oscillations of the links between said surfaces.

5. In combination with a portable stretcher, comprising a rectangular bed and carrier means associated with each apex of the rectangular bed, a shock-damping suspension comprising a pack of blade springs connecting each apex of the rectangular bed with the associated carrier means, four pairs of guides of plastic material, provided each with vertical parallel guiding surfaces facing each other to either side of the gap between the latter and parallel with the longitudinal axis of the stretcher, the guides of each pair being yieldingly carried respectively by the corresponding apex and by the carrier means associated with said apex, four flat links fitted between the guiding surfaces of the guides of the corresponding pair to be held and pivotally supported between said guiding surfaces, the length of each link being selected to ensure substantial parallelism between said link and the pack of blade springs connecting the apex and the cooperating carrier means carrying last-mentioned guides.

6. In a portable conveyance, chiefly a stretcher, comprising a bed and a foot and handle system for carrying said bed at each end of the latter, the provision of a suspension comprising at least one pack of blade springs connecting each end of the bed with the cooperating foot and handle system, and at least one link extending in substantial parallelism with each pack and pivotally connected with the corresponding end of the bed and with the cooperating foot and handle system, fittings rigid respectively with each end of the bed and with the cooperating foot and handle system, engaging each the corresponding end of the suspension on the same end of the bed, cams carried by each end of the bed and engaging the upper surface of the corresponding pack, further cams carried by each foot and handle system and engaging the lower surface of the corresponding pack, the cams engaging the cooperating pack surfaces over increasing area under the action of increasing loads on the bed.

7. In a portable conveyance, chiefly a stretcher, comprising a bed and a foot and handle system for carrying said bed at each end of the latter, the provision of a suspension comprising at least one pack of blade springs connecting each end of the bed with the cooperating foot and handle system, and at least one link extending in substantial parallelism with each pack and pivotally connecting with one of the following parts: the corresponding end of the bed and the cooperating foot and handle system, fittings rigid respectively with each end of the bed and with the cooperating foot and handle system, and engaging each the corresponding end of the suspension on the same end of the bed, and a shock absorber cooperating with at least one end of each link and including means urging frictionally said end against the corresponding member.

8. A portable stretcher comprising a rectangular bed, carrier, means at each end of the latter, a suspension including springs fitted between each end of the bed and the corresponding carrier means at least one link pivotally connecting each end of the bed with the corresponding carrier means and the ends of which pivot round parallel axes extending transversely of the cooperating members, the bed and the carrier means, and a shock absorber associated with at least one end of each link and including a rigid part carried by the member cooperating with said end of the link and one surface of which faces last-mentioned link end and is parallel therewith and springs carried by last-mentioned member and frictionally urging the rigid part against said end of the link.

References Cited in the file of this patent

UNITED STATES PATENTS

| | | |
|---|---|---|
| 681,559 | Lohsen | Aug. 27, 1901 |
| 2,177,934 | Britton et al. | Oct. 31, 1939 |
| 2,550,331 | Crookston | Apr. 24, 1951 |

FOREIGN PATENTS

| | | |
|---|---|---|
| 113,345 | Great Britain | Feb. 21, 1918 |
| 139,324 | Great Britain | Mar. 4, 1920 |